United States Patent
Holvoet et al.

(10) Patent No.: US 10,844,223 B2
(45) Date of Patent: *Nov. 24, 2020

(54) WOOD ADHESIVE FORMULATION

(71) Applicant: Huntsman International LLC, The Woodlands, TX (US)

(72) Inventors: Servaas Holvoet, Veltem-Beisem (BE); Daniele Pratelli, Brussels (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,590

(22) Filed: Oct. 27, 2015

(65) Prior Publication Data

US 2016/0046811 A1  Feb. 18, 2016

Related U.S. Application Data

(62) Division of application No. 14/370,063, filed as application No. PCT/EP2013/050212 on Jan. 8, 2013, now abandoned.

(30) Foreign Application Priority Data

Jan. 26, 2012 (EP) .................................... 12152557

(51) Int. Cl.
| | |
|---|---|
| *C08L 97/02* | (2006.01) |
| *C08G 18/10* | (2006.01) |
| *C08G 18/76* | (2006.01) |
| *C09J 197/02* | (2006.01) |
| *C08G 18/48* | (2006.01) |
| *C09J 161/24* | (2006.01) |
| *C08L 75/08* | (2006.01) |
| *C08L 79/02* | (2006.01) |

(52) U.S. Cl.
CPC ............ *C08L 97/02* (2013.01); *C08G 18/10* (2013.01); *C08G 18/4837* (2013.01); *C08G 18/7664* (2013.01); *C08L 75/08* (2013.01); *C08L 79/02* (2013.01); *C09J 161/24* (2013.01); *C09J 197/02* (2013.01)

(58) Field of Classification Search
CPC .......... C08L 97/02; C08L 75/08; C08L 79/02; C08L 61/24; C09J 197/02; C09J 161/24; C08G 18/10; C08G 18/4837; C08G 18/7664

See application file for complete search history.

(56) References Cited

U.S. PATENT DOCUMENTS

| | | | | |
|---|---|---|---|---|
| 3,242,230 | A | * 3/1966 | Habib | ...................... C08G 8/28 525/456 |
| 3,694,386 | A | 9/1972 | Hoeschele | |
| 4,109,043 | A | * 8/1978 | DeLapp | .................. B32B 21/06 156/307.5 |
| 4,546,039 | A | * 10/1985 | Horacek | ................ C08G 18/10 156/331.4 |
| 4,833,182 | A | 5/1989 | Israel et al. | |
| 4,882,112 | A | * 11/1989 | Maki | ...................... C08G 18/10 264/109 |
| 5,364,897 | A | 11/1994 | Knight et al. | |
| 5,744,079 | A | * 4/1998 | Kimura | .................. B27N 3/002 264/109 |
| 6,136,408 | A | 10/2000 | Radcliffe et al. | |
| 6,297,313 | B1 | 10/2001 | Hsu | |
| 6,316,539 | B1 | 11/2001 | Hobisch et al. | |
| 2011/0210466 | A1* | 9/2011 | Phanopoulos | ........ C07C 265/14 264/128 |
| 2014/0364557 | A1 | 12/2014 | Holvoet et al. | |
| 2014/0371382 | A1 | 12/2014 | Holvoet et al. | |

FOREIGN PATENT DOCUMENTS

| | | |
|---|---|---|
| DE | 10 2006 021 266 | 11/2006 |
| EP | 0018061 | 10/1980 |
| GB | 1 223 320 | 2/1971 |
| GB | 1 444 933 | 8/1976 |
| GB | 1 523 601 | 9/1978 |
| GB | 2 018 796 | 10/1979 |

OTHER PUBLICATIONS

Rebsdat, S., et al., "Ethylene Glycol," Ullmann's Encyclopedia of Industrial Chemistry, published online 2000, vol. 13, 531-546.*
Diem, H. et al., "Amino Resins," Ullmann's Encyclopedia of Industrial Chemistry, vol. 3., 79-106, published online 2010.*
Wieland, S. et al.; "Microcrystallinity and Colloidal Peculiarities of UF/Isocyanate Hybrid Resins"; Journal of Applied Polymer Science, vol. 104, pp. 2633-2636 (2007).

* cited by examiner

*Primary Examiner* — Nicholas E Hill
(74) *Attorney, Agent, or Firm* — Huntsman International LLC; Robert Diaz

(57) ABSTRACT

A formulation containing (i) a first component formed from at least one isocyanate and at least one polyether and (ii) a second component including at least one amino resin, wherein the amino resin is the condensation product of an aldehyde and at least one of urea, melamine, benzoguanamine, glycoluril, and acetoguanamine. A process for binding lignocellulosic materials using the formulation is also described.

19 Claims, No Drawings

WOOD ADHESIVE FORMULATION

CROSS-REFERENCE TO RELATED APPLICATIONS

This application is a Divisional of U.S. application Ser. No. 14/370,063, pending, which is the National Phase of International Application PCT/EP13/50212 filed Jan. 8, 2013 which designated the U.S. and which claims priority to EP Patent Application Serial No. 12152557.0 filed Jan. 26, 2012. The noted applications are incorporated herein by reference.

FIELD OF THE INVENTION

The present invention relates to an amino resin/isocyanate formulation or composition suitable as a wood adhesive.

BACKGROUND OF THE INVENTION

Amino resins, such as urea-formaldehyde resins (UF), are the most widely used wood adhesives, particularly for particleboard manufacturing, because of their low cost, high cure speeds and good performances. Typically, the addition of isocyanates, such as methylene diphenyl diisocyanate (MDI), to UF resins is done to improve the latter's performance in terms of hydrolytic stability and mechanical performances such as minimum strength, modulus, compression hardness and thickness swells, and formaldehyde emissions.

Urea-formaldehyde resins are aqueous glue systems and show poor miscibility characteristics with isocyanates upon blending/mixing. As a consequence, phase separation may occur in the mix yielding isocyanate enriched regions. For example, it has been reported (Wieland et al, Journal of Applied Polymer Science, 104, 2633-2636, 2007) that clusters and colloidal aggregates are formed after curing UF and polymeric methylene diphenyl diisocyanate (pMDI). Obviously, such compatibility controlled morphology affects the final glue properties.

Poor miscibility of the components may also lead to glues having an increased surface area (different morphology, droplet-like topography). In addition, these materials also display high sol contents, due to lower degrees of conversion/crosslinking.

Phase separation may also influence the kinetics of the gluing. Better miscibility may improve (i.e. lower) the gel times of hybrid amino resin/isocyanate adhesives.

The problem of phase separation upon blending has remained unsolved so far. Currently, partial solutions in the art comprise the following methods:

Using surfactants to improve miscibility, e.g. silicones. This solution is not preferred because of plasticization issues, fugitivity of the surfactant (migration to surface), post-production paintability, and potential adhesion/release issues.

Modification (e.g. chemical modification) of MDI with UF-like compounds to improve compatibility. For example, GB 1223320 describes the synthesis of ureido-terminated polyurethanes for usage in thermosetting resins of the aldehyde type. This solution is not preferred because of stability issues, such as a limited shelf-life.

Using specialized mixing configurations (high shear, ultrasonic mixing, etc.) and/or using higher mixing energies in order to better homogenize isocyanate droplets within the amino resin matrix. This solution is not preferred because special mixing devices/configurations are necessary. Moreover, the mixture may only have limited pot life before thermodynamically preferred qualities are established.

Therefore, there remains a need for formulations or compositions that overcome one or more of the aforementioned issues. It is an object of the present invention to overcome one or more of the aforementioned issues. More in particular, it is an object of the present invention to improve the miscibility of amino resin/isocyanate hybrid mixtures.

The present inventors have now surprisingly found that one or more of these objects can be obtained by a formulation or composition comprising an amino resin, an isocyanate and a polyether. This formulation can provide a dramatically improved miscibility. A better miscible and more compatible system may ameliorate the overall performance of such hybrid adhesive systems.

Compared to the use of silicone surfactants, the addition of a polyether as compatibilizing agent avoids any adhesion/release problems and/or post-production paintability issues. Moreover, the polyether has the advantage of being a non-fugitive additive.

SUMMARY OF THE INVENTION

According to a first aspect of the present invention, a formulation suitable as a wood adhesive is provided. The composition according to the first aspect of the invention comprises:

a first component which is formed from at least one isocyanate and at least one polyether, wherein said polyether comprises at least one ethylene oxide moiety and at least one isocyanate-reactive group selected from the group comprising hydroxyl, amino, epoxy, and thiol; and a second component comprising at least one amino resin, wherein said amino resin is the condensation product of an aldehyde with a compound selected from the group comprising urea, melamine, benzoguanamine, glycoluril, acetoguanamine and mixtures thereof.

According to a second aspect, the present invention also encompasses a composition obtained by mixing the first component with the second component of the formulation according to the first aspect of the invention.

According to a third aspect, the present invention also encompasses a method for preparing a composition according to the second aspect of the invention, comprising the steps of:

mixing at least one isocyanate with at least one polyether to prepare a first component as described in the first aspect of the invention; and adding to the first component a second component comprising at least one amino resin as described in the first aspect of the invention, and mixing thereby obtaining a composition according to the second aspect of the invention.

According to a fourth aspect, the present invention also encompasses the use of a formulation according to the first aspect of the invention or a composition according to the second aspect of the invention as an adhesive.

According to a fifth aspect, the present invention also encompasses a lignocellulosic body prepared using a formulation according to the first aspect of the invention or a composition according to the second aspect of the invention.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, which illustrates, by way of example, the principles of the invention.

Before the present formulations of the invention are described, it is to be understood that this invention is not limited to particular formulations described, since such formulations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. By way of example, "an isocyanate" means one isocyanate or more than one isocyanate.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Throughout this application, the term "about" is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

As used herein, the term "alkyl" by itself or as part of another substituent, refers to a straight or branched saturated hydrocarbon radical group joined by single carbon-carbon bonds having 1 or more carbon atoms, for example 1 to 12 carbon atoms, for example 1 to 6 carbon atoms, for example 1 to 4 carbon atoms, for example 2 to 3 carbon atoms. Examples of $C_{1-12}$ alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

As used herein, the term "$C_{6-10}$ aryl", by itself or as part of another substituent, refers to phenyl, naphthyl, indanyl, or 1,2,3,4-tetrahydro-naphthyl.

As used herein, the term "$C_{6-10}$ aryl $C_{1-6}$ alkyl", by itself or as part of another substituent, refers to a $C_{1-6}$ alkyl group as defined herein, wherein one or more hydrogen atoms are replaced by a $C_{6-10}$ aryl as defined herein. Examples of $C_{6-10}$ aryl $C_{1-6}$ alkyl radicals include benzyl, phenethyl, dibenzylmethyl, methylphenylmethyl, 3-(2-naphthyl)-butyl, and the like.

DETAILED DESCRIPTION OF THE INVENTION

The present invention provides a formulation comprising:
a first component which comprises at least one isocyanate and at least one polyether, wherein said polyether comprises at least one ethylene oxide moiety and at least one isocyanate-reactive group selected from the group comprising hydroxyl, amino, epoxy, and thiol;
a second component comprising at least one amino resin, wherein said amino resin is the condensation product of an aldehyde with a compound selected from the group comprising urea, melamine, benzoguanamine, glycoluril, acetoguanamine and mixtures thereof.

In particular, the present invention provides a formulation comprising:
a first component which is formed from at least one isocyanate and at least one polyether, wherein said polyether comprises at least one ethylene oxide moiety and at least one isocyanate-reactive group selected from the group comprising hydroxyl, amino, epoxy, and thiol; preferably said polyether comprises at least one ethylene oxide moiety and at least one hydroxyl,
a second component comprising at least one amino resin, wherein said amino resin is the condensation product of an aldehyde with a compound selected from the group comprising urea, melamine, benzoguanamine, glycoluril, acetoguanamine and mixtures thereof.

The first component of the formulation according to the invention comprises at least one isocyanate. In an embodiment, the at least one isocyanate comprises a polyisocyanate compound. Non-limiting examples of suitable polyisocyanates that can be used in the present invention can be any organic polyisocyanate compound or mixture of organic polyisocyanate compounds, preferably wherein said compounds have at least two isocyanate groups. Non-limiting examples of organic polyisocyanates include diisocyanates, particularly aromatic diisocyanates, and isocyanates of higher functionality. Non-limiting examples of organic polyisocyanates which may be used in the formulation of the present invention include aliphatic isocyanates such as hexamethylene diisocyanate; and aromatic isocyanates such as diphenylmethane diisocyanate (MDI) in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), m- and p-phenylene diisocyanate, tolylene-2,4- and tolylene-2,6-diisocyanate (also known as toluene diisocyanate, and referred to as TDI, such as 2,4-TDI and 2,6-TDI) in any suitable isomer mixture, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane (e.g. 4,4'-diisocyanatodicyclohexylmethane (H12MDI)), triisocyanates such as 2,4,6-triisocyanatotoluene and 2,4,4-triisocyanatodiphenylether, isophorone diisocyanate (IPDI), butylene diisocyanate, trimethylhexamethylene diisocyanate, isocyanatomethyl-1,8-octane diisocyanate, tetramethylxylene diisocyanate (TMXDI), 1,4-cyclohexanediisocyanate (CDI), and tolidine diisocyanate (TODI).

Modified polyisocyanates containing isocyanurate, carbodiimide or uretonimine groups may be employed as well. Further blocked polyisocyanates, such as the reaction product of a phenol or an oxime and a polyisocyanate, may be used, preferably wherein the blocked polyisocyanate has a deblocking temperature below the temperature applied when using the polyisocyanate composition. Mixtures of isocyanates may be used, for example, a mixture of tolylene diisocyanate isomers, such as the commercially available mixtures of 2,4- and 2,6-isomers, and for example also the mixture of di- and higher polyisocyanates produced by phosgenation of aniline/formaldehyde condensates. Such mixtures are well-known in the art and include the crude phosgenation products containing methylene bridged polyphenyl polyisocyanates, including diisocyanate, triisocyanate and higher polyisocyanates together with any phosgenation by-products. Preferred isocyanates to be used in the present invention are those wherein the isocyanate is an aromatic diisocyanate or polyisocyanate of higher functionality such as a pure diphenylmethane diisocyanate or a mixture of methylene bridged polyphenyl polyisocyanates containing diisocyanates, triisocyanates and higher functionality polyisocyanates. Methylene bridged polyphenyl polyisocyanates can be prepared by phosgenation of corresponding mixtures of polyamines obtained by condensation of aniline and formaldehyde.

In an embodiment, the at least one isocyanate can be an emulsifiable polyisocyanate. Suitable emulsifiable isocyanate can be any kind of emulsifiable MDI, such as those disclosed in the following patent publications: EP 18061, EP 516361, GB 1523601, GB 1444933, GB 2018796, all incorporated herein by reference. A suitable class of emulsifiable MDI comprises those products obtained by pre-reacting a polyisocyanate, especially polymeric MDI, with a minor proportion of an alkoxypolyalkylene glycol (e.g. one in which one of the glycol —OH groups has been converted to an alkoxy group, for example by reaction with a lower alcohol such as methanol and/or ethanol), such products being mixtures of the polyisocyanate and a minor proportion of a nonionic surfactant formed by reaction between the polyisocyanate and the alkoxypolyalkylene glycol. The self-emulsifiable polyisocyanate may be based on any organic polyisocyanate, for example low functionality MDI variants such as uretonimine modified MDI, but is preferably based on the mixtures known as polymethylene polyphenyl polyisocyanates or polymeric MDI. Alkoxypolyalkylene glycols which may be reacted with the polyisocyanate to form the self-emulsifiable polyisocyanate include alkoxypolyethylene glycols, such as those having molecular weights in the range 250 to 4000, particularly 600 to 2000. The alkoxy group suitably contains from one to six carbon atoms, the methoxypolyethylene glycols being preferred. Suitable emulsifiable polyisocyanates are commercially available from Huntsman under the trade names Suprasec 1042, Suprasec 2405, Suprasec 2408 and Suprasec 2419 (Suprasec is a trademark of Huntsman LLC).

In an embodiment, the at least one isocyanate can be selected from 2,4'-, 2,2'- and 4,4'-MDI isomers, homopolymers and mixtures thereof, mixtures of 2,4'-, 2,2'- and 4,4'-methylene diphenyl diisocyanate and oligomers thereof. In an embodiment, the at least one isocyanate is selected from the group comprising 2,2'- or 4,4'-MDI, homopolymers and mixtures thereof, or mixtures of 2,2'- and 4,4'-methylene diphenyl diisocyanate and oligomers thereof. In an embodiment, the at least one isocyanate is selected from 4,4'-MDI or homopolymers thereof.

The polyisocyanate mixture may be produced in accordance with any of the techniques known in the art. The isomer content of the diphenylmethane diisocyanate may be brought within the required ranges, if necessary, by techniques which are well known in the art. One technique for changing isomer content is to add monomeric MDI to a mixture of MDI containing an amount of polymeric MDI which is higher than desired.

In an embodiment, the at least one isocyanate comprises any suitable mixture of any polyisocyanate described above, or any suitable mixture of one or more of the polyisocyanates described above with MDI-type polyisocyanates.

In some embodiments, the at least one isocyanate can be present in an amount of at least 0.5% by weight, based on 100% by weight of the total formulation. For example, the at least one isocyanate can be present in the formulation in an amount of at least 5% by weight, for example in an amount of at least 10% by weight, for example in an amount of at least 15% by weight based on the total weight (100%) of the formulation. For example, the at least one isocyanate can be present in an amount of from 0.5 to 60% by weight, for example from 5 to 40% by weight, for example from 10 to 30% by weight, for example from 15 to 25% by weight based on the 100% by weight of the total formulation.

The first component of the formulation according to the invention comprises also at least one polyether, wherein said polyether comprises at least one ethylene oxide moiety and at least one isocyanate-reactive group selected from the group comprising hydroxyl, amino, epoxy, and thiol, preferably hydroxyl.

The polyether as used herein can represent mixtures of different alkoxylation products of polyols. Preferred polyols include those in which polymerized propylene oxide units and/or polymerized ethylene oxide units are present. These units may be arranged in statistical distribution, in the form of polyethylene oxide blocks within the chains and/or terminally.

In an embodiment, the polyether has an average nominal functionality of 1 to 6, more preferably a functionality of 1 to 4, most preferably a functionality of 1 or 2. The term "average nominal functionality" is used herein to indicate the number average functionality (number of functional groups per molecule) of the polyether on the assumption that this is the number average functionality of the initiator(s) used in their preparation, although in practice it will often be somewhat less because of some terminal unsaturation.

As used herein, the term "average" refers to number average unless indicated otherwise. Preferably, the functional groups are isocyanate-reactive functional groups. Non-limiting examples of isocyanate-reactive groups can be selected from the group comprising hydroxyl, amino, epoxy, and thiol.

The at least one polyether for use in the formulation comprises at least one ethylene oxide moiety. Preferably, polyethers useful for preparing the formulation of the present invention contain at least about 15% by weight ethylene oxide groups, and more preferably between 50% to 100% by weight ethylene oxide groups, based on 100% by weight of the at least one polyether.

As used herein, the terms "polyether comprising at least one ethylene oxide moiety", "ethylene oxide containing polyether", and "EO containing polyether" are used interchangeably. As used herein, the terms "ethylene oxide moiety", "ethylene oxide group" and "ethylene oxide unit" are used interchangeably, and refer to moieties of the formula ($—CH_2—CH_2—O—$), excluding such moieties that form part of a propylene oxide moiety, described by the formula ($—CH_2—CH_2—CH_2—O—$).

Non-limiting examples of polyethers which can be used for preparing the formulation according to the invention include the products obtained by the polymerization of ethylene oxide, including products obtained by the copolymerisation of ethylene oxide with another cyclic oxide, for example propylene oxide, in the presence of an initiator compound, preferably in the presence of one or more polyfunctional initiators.

Suitable initiator compounds contain a plurality of active hydrogen atoms and comprise water and low molecular weight polyethers, for example, ethylene glycol, propylene glycol, diethylene glycol, dipropylene glycol, cyclohexane dimethanol, resorcinol, bisphenol A, glycerol, trimethylolopropane, 1,2,6-hexanetriol, pentaerythritol and the like. Mixtures of initiators and/or cyclic oxide may be used.

Especially useful polyethers suitable for the invention include poly(oxyethylene oxypropylene) diols and/or triols obtained by the sequential addition of propylene and ethylene oxides to di- or trifunctional initiators, as fully described in the prior art. Mixtures of said diols and triols are also useful. Highly preferred are monols and diols.

According to embodiments of the present invention, the at least one polyether can be selected from the group comprising poly ethylene glycol, poly ethylene glycol monomethyl ether, poly ethylene glycol monoethyl ether, poly ethylene glycol monopropyl ether, poly ethylene glycol monoisopropyl ether, poly ethylene glycol monobutyl ether, poly ethylene glycol monopentyl ether, poly ethylene glycol monohexyl ether, poly ethylene glycol monophenyl ether, poly ethylene glycol monobenzyl ether and mixtures thereof. Preferably, the at least one polyether can be selected from the group comprising poly ethylene glycol monomethyl ether, poly ethylene glycol, or mixtures thereof.

In an embodiment of the invention, the polyether has a number average equivalent weight of about 700 to about 5000, and a preferred equivalent weight ranging from about 1000 to about 4000, more preferably ranging from about 1200 to about 3500 and most preferably ranging from about 1500 to about 3000. According to some embodiments, the polyether can have an average molecular weight $M_w$ of from 62 to 40000, preferably from 100 to 20000, more preferably from 200 to 10000, most preferably from 400 to 6000.

In some embodiments, the polyether can be present in an amount of at least 0.01% by weight based on 100% by weight of the total formulation. For example, the polyether can be present in an amount of at least 0.03% by weight, for example in an amount of at least 0.1% by weight, for example in an amount of at least 0.3% by weight, preferably in an amount of at least 0.5% by weight based on 100% by weight of the formulation.

As used herein, the terms "% by weight", "wt %", "weight percentage", or "percentage by weight" are used interchangeably.

In some embodiments, the polyether can be present in the formulation in an amount ranging from 0.01 to 50% by weight, for example from 0.03 to 40% by weight, desirably from 0.1 to 30% by weight, preferably from 0.3 to 25% by weight, preferably from 0.5 to 20% by weight based on 100% by weight of the formulation.

According to some embodiments, the formulation can have an ethylene oxide (EO) content of at least 1% by weight, based on 100% by weight of the at least one isocyanate and the at least one polyether combined. For example, the EO content can be of at least 2% by weight, for example of at least 3% by weight, for example of at least 5% by weight, for example of at least 10% by weight, for example of at least 15% by weight, for example of at least 20% by weight, for example of at least 25% by weight, for example of at least 30% by weight, for example of at least 40% by weight, based on 100% by weight of the at least one isocyanate and the at least one polyether combined.

As used herein, the term "EO content to isocyanate" refers to the part, expressed in weight-percentage, of ethylene oxide, as compared to the total amount by weight of the at least one isocyanate and the at least one polyether combined.

The first component hence comprises the reaction product of the isocyanate and the isocyanate-reactive polyether. Since the isocyanate is generally used in an excess molar ratio compared to the isocyanate-reactive groups present in the polyether (molar ratio OH/NCO generally in the range 0.01 to 0.99) the first component still contains reactive isocyanate groups.

The present formulation also comprises a second component, which comprises at least one amino resin, wherein said resin is the condensation product of an aldehyde with at least one compound selected from the group comprising urea, melamine, benzoguanamine, glycoluril, acetoguanamine and mixtures thereof.

Non-limiting examples of suitable aldehydes comprise formaldehyde, acetaldehyde, crotonaldehyde, acrolein, benzaldehyde, and furfural; preferably the aldehyde is formaldehyde.

Non-limiting examples of suitable amino resins comprise urea-formaldehyde resins, melamine-formaldehyde resins, melamine-urea-formaldehyde resins, melamine-urea-phenol-formaldehyde resins, melamine-phenol-formaldehyde resins, benzoguanamine-formaldehyde resins, glycoluril-formaldehyde resins and acetoguanamine-formaldehyde resins.

According to some embodiments, the at least one amino resin is present in an amount of at least 30% by weight, based on 100% by weight of the total formulation. For example, the at least one amino resin can be present in an amount of at least 40% by weight, for example of at least 50% by weight, based on 100% by weight of the formulation. For example, the at least one amino resin can be present in the formulation in an amount of from 30 to 95% by weight, for example from 40 to 90% by weight, for example from 50 to 85% by weight, based on 100% by weight of the formulation.

In some embodiments, the formulation can further comprise at least one additive selected from the group comprising a hardener, a surfactant, a release agent, a wax, or a pigment.

In some embodiments, the additive can be present in an amount of at least 0.01% by weight, for example at least 0.03% by weight, for example at least 0.1% by weight, preferably at least 0.3% by weight, preferably at least 1% by weight based on the total weight (100%) of the formulation.

In an embodiment, said additive is a hardener. Non limiting examples of suitable hardeners comprise ammonium salts, anhydrides and amines. In some embodiments, the hardener can be an ammonium salt of an organic or inorganic acid. Non-limiting examples of ammonium salts are ammonium sulfate, ammonium chloride, ammonium carbonate, mono- and di-ammonium phosphate, ammonium borate, ammonium citrate and ammonium nitrate. Preferably, the hardener is selected from ammonium sulfate or ammonium chloride, preferably the hardener is ammonium sulfate. A non-limiting example of a surfactant is silicone. Non-limiting examples of waxes are slack wax or emulsion wax. Non-limiting examples of suitable pigments comprise titanium dioxide, zinc borax, oxalates, mica, perlite, clays, and silicon dioxide.

The present invention also encompasses a composition obtained by mixing the first component with the second component of the formulation according to the invention.

The present invention also encompasses a method for preparing a composition as described above, comprising the steps of:
  mixing at least one isocyanate with at least one polyether to prepare a first component as described above; and
  adding to the first component a second component comprising at least one amino resin as described above and mixing thereby obtaining a composition as described above.

The present formulations and compositions provide particularly good adhesives.

The present invention also encompasses the use of the formulation or composition according to the invention as an adhesive. The formulation or composition can be particularly useful as an adhesive for a material comprising lignocellulose, herein also referred to as a "lignocellulosic material".

Non-limiting examples of lignocellulosic materials comprise wood strands, woodchips, wood fibers, shavings, veneers, wood wool, cork, bark, sawdust and like waste products of the wood working industry as well as other materials having a lignocellulosic basis such as paper, bagasse, straw, flax, sisal, bamboo, coconut fibers, hemp, rushes, reeds, rice hulls, husks, grass, nutshells and the like. Additionally, the lignocellulosic material may be mixed with other particulate or fibrous materials such as grinded foam waste (for example, grinded polyurethane foam waste), mineral fillers, glass fiber, mica, rubber, textile waste such as plastic fibers and fabrics. The lignocellulosic material may be used in the form of granulates, shavings or chips, fibers, strands, spheres or powder. Preferably, the lignocellulosic material comprises wood.

The present invention also encompasses the use of the formulation or composition according to the invention for bonding at least one lignocellulose containing product, herein also referred to as a "lignocellulosic body". The formulations or compositions according to the invention can also be particularly useful for repairing a lignocellulosic body.

The present invention also encompasses a process for bonding lignocellulosic materials comprising coating the lignocellulosic materials with a formulation or composition according to the invention and curing the formulation or composition.

The present invention also encompasses a substrate comprising a formulation or composition according to the invention.

The present invention also encompasses a lignocellulosic body prepared using the formulation or composition according to the invention.

The lignocellulosic body can be prepared by bringing the lignocellulosic material into contact with a formulation or composition according to the invention, for example by means of mixing, spraying and/or spreading the formulation or composition with/onto the lignocellulosic material and by pressing the lignocellulosic material, preferably by hot-pressing, for example at a temperature between 120° C. to 300° C., preferably between 140° C. to 270° C. and for example at 2 to 6 MPa specific pressure. The lignocellulosic material after treatment with the formulation or composition according to the invention can be placed on caul plates made of aluminum or steel which serve to carry the furnish into the press where it is compressed to the desired extent, usually at a temperature between 120° C. and 300° C., preferably between 140° C. and 270° C. At the start of a manufacturing run it may be helpful, but not essential, to condition the press plates by spraying their surfaces with an external release agent or to increase the cycle time of the first press load. A preconditioned press may then be used many times in the process of the invention without further treatment.

Non-limiting examples of lignocellulosic bodies include oriented strand board (OSB), structural composite lumber (SCL), waferboard, fiberboard, particle board, chipboard, medium-density fiberboard (MDF), hardboard (also called high-density fiberboard or HDF), plywood, and boards that are a composite of strands and ply veneers.

The invention is illustrated but not limited by the following examples.

The examples described hereunder illustrate the effect of the formulations and compositions according to embodiments of the present invention. Unless otherwise indicated, all parts and all percentages in the following examples, as well as throughout the specification, are parts by weight or percentages by weight respectively. As used herein, the term "EO content to MDI" refers to the weight percentage of the ethylene oxide content of the at least one polyether to the total weight of the at least one isocyanate and the at least one polyether combined, wherein the isocyanate is MDI or pMDI.

The following compounds were used in the examples:
  Suprasec 5025 is a polymeric methylene diphenyl isocyanate (pMDI) with a number average molecular weight $M_n$ of 375 (Huntsman).
  Suprasec 3030 is a mixture of methylene diphenyl isocyanate (MDI) isomers with a number average molecular weight $M_n$ of 250 (Huntsman).
  DME 500 is a dimethoxy polyethylene oxide with a weight average molecular weight $M_w$ of 500 (Huntsman).
  MoPEG 750 is a polyethylene glycol mono methyl ether with a weight average molecular weight $M_w$ of 750 (Huntsman).

Daltocel F442 is a poly(oxyethyl/oxypropyl)polyether with an ethylene oxide content of 73.5% and a weight average molecular weight $M_w$ of 3500 (Huntsman). The EO content was determined from 1H-NMR.

The gel times of the formulations or compositions of the examples were measured by transferring 5 g of the formulation or composition into a glass tube. The tube was then immersed in an oil bath at 100° C. and a glass spatula was used to stir with a continuous vertical movement. The time was recorded from the immersion point until the mixture was gelled. The gel point is defined as the point in time in which the viscosity has increased in such extent that the mixture resists to further stirring.

For all the examples, the isocyanate reaction exotherm was measured with Differential Scanning Calorimetry (DSC) in the presence of sapwood (55/45 w/w glue/sapwood; 20 mg sample; 5° C./min ramp from −20° C. to 200° C.).

Comparative Example 1

2.10 g of polymeric methylene diphenyl isocyanate pMDI (Suprasec 5025) was mixed with 7.90 g of UF and 0.2 g of ammonium sulfate (hardener) at 25° C.

There was no polyether additive, and the EO content to MDI was 0.0%. Gel time was 1 min 40 sec and the gelation exotherm was 100.0° C.

Comparative Example 2

1.80 g of polymeric methylene diphenyl isocyanate pMDI (Suprasec 5025) was mixed with 0.20 g of dimethoxy polyethylene oxide $M_w$ 500 (DME 500) and stirred for 1 hour at 50° C. Thereafter, this isocyanate was added to 8.00 g UF and 0.2 g of ammonium sulfate (hardener) at 25° C.

The added polyether did not comprise isocyanate-reactive functional groups, and the EO content to MDI was 10.0%. Gel time was 1 min 50 sec and the gelation exotherm was 100.0° C.

Example 3

2.08 g of polymeric methylene diphenyl isocyanate pMDI (Suprasec 5025) was mixed with 0.06 g of poly ethylene glycol mono methyl ether $M_w$ 750 (MoPEG 750) and stirred for 1 hour at 50° C. Thereafter, this isocyanate was added to 7.86 g UF and 0.2 g of ammonium sulfate (hardener) at 25° C.

The added polyether was a mono-reactive polyether with EO content to MDI of 3.0%. Gel time was 1 min 26 sec and the gelation exotherm was 95.0° C.

Example 4

2.06 g of polymeric methylene diphenyl isocyanate pMDI (Suprasec 5025) was mixed with 0.22 g of poly ethylene glycol mono methyl ether $M_w$ 750 (MoPEG 750) and stirred for 1 hour at 50° C. Thereafter, this isocyanate was added to 7.72 g UF and 0.2 g of ammonium sulfate (hardener) at 25° C.

The added polyether was a mono-reactive polyether with EO content to MDI of 10.0%. Gel time was 1 min 23 sec and the gelation exotherm was 80.0° C.

Example 5

1.65 g of methylene diphenyl isocyanate MDI (Suprasec 3030) was mixed with 1.89 g of a poly(oxyethyl/oxypropyl) polyether $M_w$ 3500 (Daltocel F442) and stirred for 1 hour at 50° C. Thereafter, this isocyanate was added to 6.48 g UF and 0.2 g of ammonium sulfate (hardener) at 25° C.

The added polyether was a di-reactive polyether with EO content to MDI of 39.0%. Gel time was 40 sec and gelation exotherm was 39.1° C.

Compared to the comparative examples 1 and 2, the results obtained in the examples according to embodiments of the invention showed that the combination of an isocyanate-reactive polyether and MDI with UF improved miscibility of the mixture. In addition, the ethylene oxide content in the polyether or in the final mixture significantly reduced the gel time and/or the temperature needed to start the cure reactions. In this way, glue (adhesive) properties can be controlled through choice of the polyether in the composition as claimed.

Next series of examples illustrate physico-mechanical properties measured on particle board panels made from UF and MDI/polyether mixtures. In all examples, the UF resin (containing 2 wt % of a 20 wt % aqueous ammonium sulphate solution) was mixed with the MDI/polyether mixture (4.3% MDI/polyether mixture in total glue) and sprayed onto Pinus sylvestris core particles in a Particle Board Blender LGM100 through two nozzles. The total glue content was kept constant to 10 wt % of glue on dry wood. The wetted wood was weighted into a 30×30 cm² mould and pre-pressed at RT (target density was 650 kg/m³). Thereafter, the pre-mat was transferred to a Siempelkamp A4900200 press and pressed at 200° C. following a specific press profile (1 press step to 15 mm by 9 s closing time, 81 s press time and 10 s de-pressure time). Finally, after cooling and conditioning at 23° C. and 50% relative humidity for a minimum of 7 days, the panels were cut to 5×5 cm² samples which enabled further characterization.

Thickness swell was measured according to standard BS 317. Internal bond strength IB V20 (dry) was measured according to standard BS 319. All values described below are the average results of 8 cut samples.

Comparative Example 6

Polymeric methylene diphenyl isocyanate pMDI (Suprasec 5025) was used, without polyether additive. The EO content to MDI was 0.0%. The average IB value and thickness swell for these particle boards was 0.59 MPa and 20.2% respectively.

Example 7

Polymeric methylene diphenyl isocyanate pMDI (Suprasec 5025) was mixed with 3 wt % poly ethylene glycol mono methyl ether $M_w$ 750 (MoPEG 750) and stirred for 1 hour at 50° C. prior to use. The added polyether was a mono-reactive polyether with EO content to MDI of 3.0%. The average IB value and thickness swell for these particle boards was 0.62 MPa and 18.6% respectively.

Example 8

Polymeric methylene diphenyl isocyanate pMDI (Suprasec 5025) was mixed with 10 wt % poly ethylene glycol mono methyl ether $M_w$ 750 (MoPEG 750) and stirred for 1 hour at 50° C. prior to use. The added polyether was a mono-reactive polyether with EO content to MDI of 10.0%. The average IB value and thickness swell for these particle boards was 0.67 MPa and 16.9% respectively.

Compared to the comparative example 6, the results obtained in the examples according to embodiments of the invention showed that the combination of an isocyanate-reactive polyether and MDI with UF improved physico-mechanical properties of wood assemblies. In addition, the ethylene oxide content in the polyether or in the final mixture significantly increased the internal bond strength and thickness swell properties of wood assemblies. In this way, physico-mechanical properties of wood composites can be controlled through choice of the polyether in the composition as claimed.

It is to be understood that although preferred embodiments and/or materials have been discussed for providing embodiments according to the present invention, various modifications or changes may be made without departing from the scope and spirit of this invention.

The invention claimed is:

1. A process for binding a plurality of lignocellulosic materials, comprising combining:
   a plurality of lignocellulosic materials; and
   (ii) a liquid adhesive formulation obtained by mixing:
      (1) a first component which is formed by mixing at least one isocyanate and at least one polyether, wherein said polyether is an alkoxypolyalkylene glycol compound having a molecular weight in the range of 250 to 4000 and contains at least 15% by weight of ethylene oxide groups, based on 100% by weight of the polyether; and wherein the liquid adhesive formulation has an ethylene oxide content of at least 10% based on 100% by weight of the at least one isocyanate and the at least one polyether combined; with
      (2) at least one amino resin comprising a condensation product of an aldehyde with a compound selected from the group consisting of urea, melamine, benzoguanamine, glycoluril, acetoguanamine and mixtures thereof, wherein said amino resin is present in an amount of at least 50% by weight based on the weight of the liquid adhesive formulation; and
   wherein the polyether is a reaction product of ethylene oxide, propylene oxide and a polyfunctional initiator comprising ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol, or mixtures thereof.

2. The process according to claim 1, wherein said aldehyde is selected from the group consisting of formaldehyde, acetaldehyde, crotonaldehyde, acrolein, benzaldehyde, furfural, or combinations thereof.

3. The process according to claim 1, wherein the at least one isocyanate is selected from the group consisting of hexamethylene diisocyanate, m- and p-phenylene diisocyanate, tolylene-2,4- and tolylene-2,6-diisocyanate, diphenylmethane diisocyanate in the form of its 2,4'-, 2,2'- and 4,4'-isomers and mixtures thereof, the mixtures of diphenylmethane diisocyanates and oligomers thereof, chlorophenylene-2,4-diisocyanate, naphthylene-1,5-diisocyanate, diphenylene-4,4'-diisocyanate, 4,4'-diisocyanate-3, 3'-dimethyl-diphenyl, 3-methyl-diphenylmethane-4,4'-diisocyanate, diphenyl ether diisocyanate, cyclohexane-2,4- and -2,3-diisocyanate, 1-methylcyclohexyl-2,4- and -2,6-diisocyanate, bis-(isocyanate-cyclohexyl)methane, 2,4,6-triisocyanatotoluene, 2,4,4-triisocyanatodiphenylether, isophorone diisocyanate, butylene diisocyanate, trimethylhexamethylene diisocyanate, isocyanatomethyl-1,8-octane diisocyanate, tetramethylxylene diisocyanate, 1,4-cyclohexanediisocyanate, tolidine diisocyanate, and mixtures thereof.

4. The process according to claim 1, wherein the at least one isocyanate is present in an amount of at least 0.5% by weight based on the weight of the liquid adhesive formulation.

5. The process according to claim 1, wherein the at least one polyether is present in an amount of at least 0.01% by weight based on the weight of the liquid adhesive formulation.

6. The process according to claim 1, wherein the liquid adhesive formulation further comprises at least one additive selected from the group consisting of a hardener, a surfactant, a release agent, a wax, and a pigment.

7. The process according to claim 1, wherein the liquid adhesive formulation is aqueous.

8. The process according to claim 1, wherein particles of the plurality of lignocellulosic materials are in the form of granulates, shavings, chips, fibers, strands, spheres, powders, or a combination thereof.

9. The process according to claim 1, wherein the plurality of lignocellulosic materials include wood, paper, bagasse, straw, flax, sisal, bamboo, coconut, fibers, hemp, rushes, reeds, rice hulls, husks, grass, nutshells, or a combination thereof.

10. The process according to claim 1, wherein the plurality of lignocellulosic materials comprises wood strands, woodchips, wood fibers, wood shavings, wood veneers, wood wool, cork, bark, sawdust, or a combination thereof.

11. A process for binding a plurality of lignocellulosic materials, comprising:
   (i) mixing (1) a first component including at least one isocyanate and at least one polyether and (2) at least one amino resin to form a liquid adhesive formulation, wherein the polyether is a reaction product of ethylene oxide, a polyfunctional initiator, and propylene oxide, and
   wherein said polyether is an alkoxypolyalkylene glycol compound having a molecular weight in the range of 250 to 4000 and contains at least 15% by weight ethylene oxide groups, based on 100% by weight of the polyether; and wherein the liquid adhesive formulation has an ethylene oxide content of at least 10% by weight based on based on 100% by weight of the at least one isocyanate and the at least one polyether combined, and
   wherein said amino resin is a reaction product of an aldehyde with a compound selected from the group consisting of urea, melamine, benzoguanamine, glycouril, acetoguanamine, and mixtures thereof, and
   wherein said amino resin is present in an amount of at least 50% by weight based on the total weight of the liquid adhesive formulation and
   (ii) combining the liquid adhesive formulation with a plurality of lignocellulosic materials.

12. The process according to claim 11, wherein said aldehyde is selected from the group consisting of formaldehyde, acetaldehyde, crotonaldehyde, acrolein, benzaldehyde, and furfural.

13. The process according to claim 11, wherein the polyether comprises 50% to 73.5% by weight ethylene oxide groups, based on the total weight of the polyether.

14. The process according to claim 11, wherein the polyfunctional initiator is selected from the group consisting of ethylene glycol, propylene glycol, diethylene glycol, dipropylene glycol, cyclohexane dimethanol, resorcinol, bisphenol A, glycerol, trimethylolpropane, 1,2,6-hexantriol, pentaerythritol, or combinations thereof.

15. The process according to claim 14, wherein the polyether is a reaction product of the polyfunctional initiator, ethylene oxide, propylene oxide, and water.

16. The process according to claim 11, wherein the liquid adhesive formulation is aqueous.

17. The process according to claim 11, wherein the liquid adhesive formulation further comprises at least one additive selected from the group consisting of a hardener, a surfactant, a release agent, a wax, and a pigment, or combinations thereof.

18. A process for binding a plurality of lignocellulosic materials, comprising combining:
   a plurality of lignocellulosic materials; and
   (ii) a liquid adhesive formulation obtained by mixing:
      (1) a first component which is formed by mixing at least one isocyanate and at least one polyether, wherein said polyether is an alkoxypolyalkylene glycol compound having a molecular weight in the range of 250 to 4000 and contains at least 15% by weight of ethylene oxide groups, based on 100% by weight of the polyether; and wherein the liquid adhesive formulation has an ethylene oxide content of at least 10% based on 100% by weight of the at least one isocyanate and the at least one polyether combined; with
      (2) at least one amino resin comprising a condensation product of an aldehyde with a compound selected from the group consisting of urea, melamine, benzoguanamine, glycoluril, acetoguanamine and mixtures thereof, wherein said amino resin is present in an amount of at least 50% by weight based on the weight of the liquid adhesive formulation; and wherein the polyether comprises 50% to 73.5% by weight ethylene oxide groups, based on 100% by weight of the polyether.

19. A process for binding a plurality of lignocellulosic materials, comprising combining:
   a plurality of lignocellulosic materials; and
   (ii) a liquid adhesive formulation obtained by mixing:
      (1) a first component which is formed by mixing at least one isocyanate and at least one polyether, wherein said polyether is an alkoxypolyalkylene glycol compound having a molecular weight in the range of 250 to 4000 and contains at least 15% by weight of ethylene oxide groups, based on 100% by weight of the polyether; and wherein the liquid adhesive formulation has an ethylene oxide content of at least 10% based on 100% by weight of the at least one isocyanate and the at least one polyether combined; with
      (2) at least one amino resin comprising a condensation product of an aldehyde with a compound selected from the group consisting of urea, melamine, benzoguanamine, glycoluril, acetoguanamine and mixtures thereof,
   wherein said amino resin is present in an amount of at least 50% by weight based on the weight of the liquid adhesive formulation; wherein the polyether is a reaction product of ethylene oxide, propylene oxide and a polyfunctional initiator comprising ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol, or mixtures thereof; and wherein the polyfunctional initiator further comprises water.

* * * * *